United States Patent [19]

Armstrong et al.

[11] Patent Number: 4,615,870

[45] Date of Patent: Oct. 7, 1986

[54] BACK-MIXED HYDROTREATING REACTOR

[75] Inventors: Robert B. Armstrong, Katy; Huibert S. Jongenburger, Houston; Pasupati Sadhukhan, Katy, all of Tex.

[73] Assignee: The M. W. Kellogg Company, Houston, Tex.

[21] Appl. No.: 710,742

[22] Filed: Mar. 11, 1985

[51] Int. Cl.[4] .............................................. B01J 8/08
[52] U.S. Cl. .................................. 422/191; 202/158; 261/77; 261/123; 422/142; 422/147; 422/193; 208/155; 208/156
[58] Field of Search ............... 422/188, 191, 193, 194, 422/195, 134, 140, 144, 147; 261/77, 123; 202/158; 208/155, 156

[56] References Cited

U.S. PATENT DOCUMENTS

| | | | |
|---|---|---|---|
| 3,412,010 | 11/1968 | Alpert et al. | 208/112 |
| 3,622,265 | 11/1971 | Weber et al. | 23/1 F |
| 3,957,626 | 5/1976 | Kubo et al. | 208/213 |
| 3,993,556 | 11/1966 | Reynolds et al. | 208/155 |
| 4,028,177 | 6/1977 | Richter | 422/195 |

FOREIGN PATENT DOCUMENTS

| | | | |
|---|---|---|---|
| 1917750 | 10/1970 | Fed. Rep. of Germany | 202/158 |
| 60-23483 | 2/1985 | Japan. | |
| 237825 | 6/1973 | U.S.S.R. | 422/140 |

*Primary Examiner*—Michael S. Marcus

[57] ABSTRACT

A hydrotreating reactor having a plurality of vertically spaced contacting stages having frusto-conical baffles for back-mixing hydrocarbon oil being treated and a plurality of clear oil outlets in fluid communication with a corresponding plurality of annular stilling chambers.

6 Claims, 2 Drawing Figures

BACK-MIXED HYDROTREATING REACTOR

This invention relates to an apparatus for hydrotreating hydrocarbons in the presence of finely divided solids, typically finely divided catalysts. More particularly, this invention relates to high pressure apparatus for three phase systems employed in hydrocracking, hydrogenation, hydrodemetallation, and hydrodesulfurization processes, and combinations thereof for treatment of heavy hydrocarbon oils such as petroleum residuum. These processes are generally characterized by contacting oil containing suspended catalyst with molecular hydrogen under high pressure between 30 and 300 kg/cm$^2$ at temperatures ranging between 250° and 500° C. Typically, the processes employ short gas residence times between 10 and 200 seconds, much longer oil residence times between $1 \times 10^3$ and $2 \times 10^4$ seconds, and, depending upon catalyst life, very long solids residence times between $1 \times 10^4$ and $1 \times 10^8$ seconds. In order to facilitate downstream recovery of hydrotreated products, it is necessary to first separate oil from the hydrogen gas and catalyst at, or preferably, within the hydrotreating reactor. Gas disengagement is easily carried out by maintaining a gas space in the upper part of the usually vertical reactor. Liquids/solids disengagement, in contrast, is quite difficult because the finely divided solids are easily suspended and vigorously mixed in the oil to promote long residence time contacting. Disengagement may be carried out in large, clear oil quiescent zones but such quiescent zones or stilling chambers are difficult to provide in the small diameter vessels that are characteristic of high pressure hydrotreating reactors. These circumstances effectively limit the capacity of a hydrotreating reactor having clear oil separation capability to the size of the quiescent zone that may be provided therein.

It is therefore an object of this invention to provide a hydrotreating apparatus having greater clear oil separation capability than known hydrotreating reactors while also improving reaction conditions by providing means for increasing the effective gas, liquid, solids contacting efficiency.

According to the invention, a hydrotreating reactor is provided with means for effecting slurry oil back-mixing comprising plural means for separating and recovering clear oil and a plurality of vertically spaced contacting stages comprising frusto-conical baffles.

Figure 1:
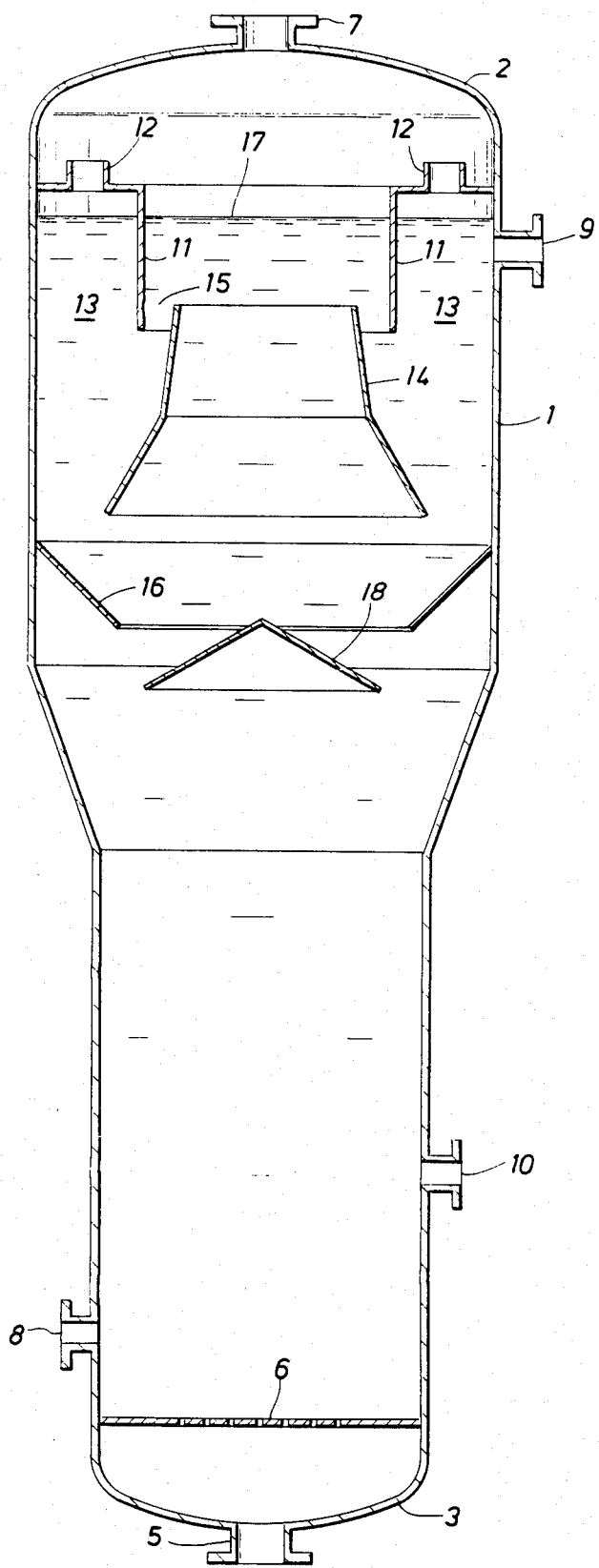
FIG. 1 illustrates a known hydrotreating reactor having a single, clear oil outlet.

Referring now to FIG. 1 which illustrates a prior art hydrotreating reactor, cylindrical pressure vessel 1 having an enlarged upper portion is provided with top head 2, bottom head 3, gas inlet 5, central gas inlet distributor 6, gas outlet 7, oil feed inlet 8, clear oil outlet 9, and slurry oil outlet 10.

Within the enlarged upper portion of the vessel, a single, annular, hooded internal baffle 11 provided with gas vents 12 is formed over and extends out from clear oil outlet 9 to form annular stilling chamber 13 with the cylindrical shell of the vessel. A frusto-conical baffle 14 is centrally mounted below and partly within hooded internal baffle 11 and forms annulus 15 therewith. Below frusto-conical baffle 14, sloping annular baffle 16 extends downwardly from the cylindrical shell of the vessel and centrally disposed conical baffle 18 is disposed adjacently below baffle 16. Baffles 16 and 18 cooperate to provide a "disc and donut" baffling action for fluid within the vessel.

In operation of the FIG. 1 hydrotreating reactor, a slurry oil level 17 is maintained above clear oil outlet 9 but well below gas outlet 7 by introduction of oil feed and catalyst through oil feed inlet 8 and steady-state withdrawal of a controlled amount of clear oil, i.e.—treated oil substantially free of catalyst, from clear oil outlet 9. Additionally, slurry oil is withdrawn from outlet 10 in order to purge the reactor of spent catalyst at a low rate.

Hydrogen is introduced to the reactor through gas inlet 5 and central distributor 6 to flow generally upward through the reactor along with gaseous reaction products and, except for hydrogen consumed in the treating reactions, is discharged through gas outlet 7 for hydrogen recovery and recycle to the reactor gas inlet.

Figure 2:
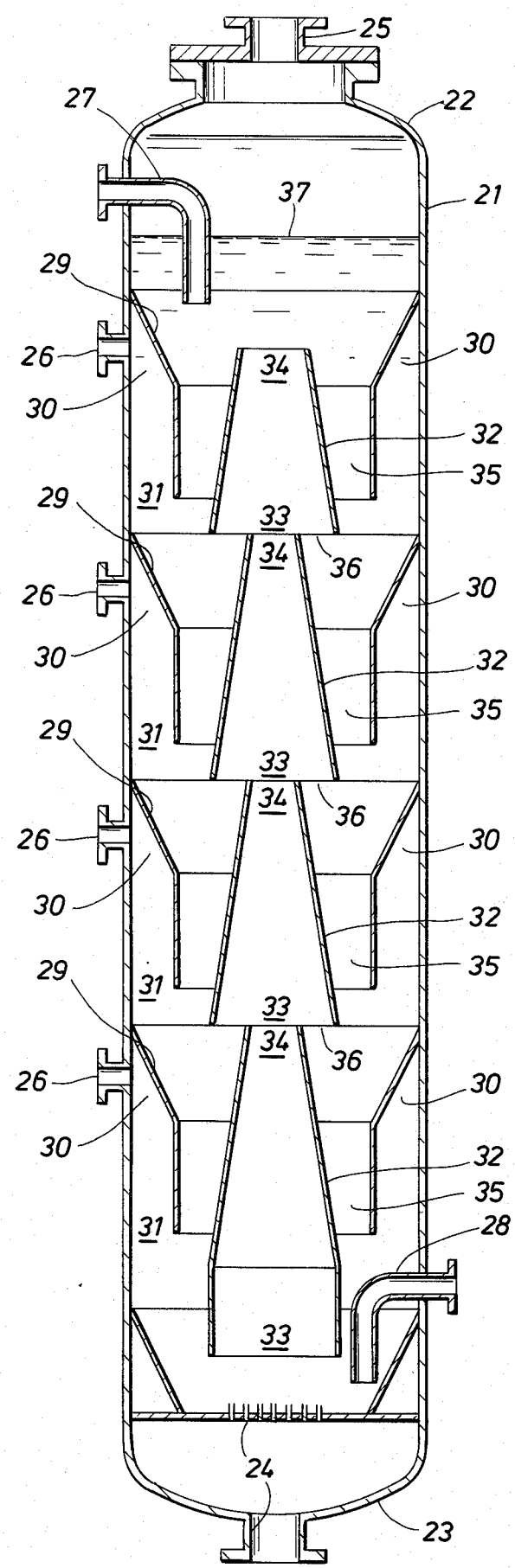
FIG. 2 illustrates a preferred hydrotreating reactor of the present invention.

Referring now to FIG. 2 which illustrates a preferred embodiment of the invention, a vertical pressure vessel is provided with cylindrical shell 21, top head 22, and bottom head 23. Gas inlet means 24 comprising an inlet located in the bottom head, a gas plenum within the bottom head, and a plurality of upwardly directed, centrally located jetting nozzles are disposed at the bottom of the vessel. Gas outlet means 25 comprised of an outlet mounted on a manway are disposed at the top of the vessel. Cylindrical shell 21 is fitted with four clear oil outlets 26 which correspond to, in this particular embodiment, an equal number of contacting stages within the vessel. Typically, a reactor will have between 2 and 10 contacting stages. The shell is also fitted with oil feed inlet means 27 comprised of an inlet nozzle and dip pipe extending slightly below the slurry oil level in the vessel and slurry oil outlet means 28 comprised of an outlet nozzle proximate the bottom of the vessel and a dip pipe located away from the vessel axis and external to the lowermost, frusto-conical baffle later described.

The reactor has a plurality of clear oil outlet means which are comprised of a clear oil outlet 26, previously recited, and an annular, hooded baffle 29 contiguous with the cylindrical shell at a point proximately above the clear oil outlet and extending downwardly below the clear oil outlet and inwardly away from the cylindrical shell to form annular stilling chamber 30 having fluid entry 31 with cross-section of an annular disc. The hooded baffle of this preferred embodiment is comprised of an upper sloped roof sealed at its outer periphery to the inside of the cylindrical shell and a lower cylindrical skirt portion parallel to the vessel shell which provides extended depth to the stilling chamber for more complete separation of settling catalyst from clear oil. The stilling chamber could be formed by a flat roof above the clear oil outlet with a cylindrical skirt extending downwardly from its inner circumference, however, this construction is less desirable because of catalyst accumulation on top of the flat roof. The stilling chamber is typically provided with means (not shown) to purge trapped gas from its upper portion and thereby maintain a flooded condition. Suitable means comprise a purge gas tube communicating the upper portion of the stilling chamber with the interior of an adjacent frusto-conical baffle located on the vessel axis.

Each contacting stage is comprised of a frusto-conical baffle 32 disposed axially within the shell and spaced adjacently from one or more of the annular, internal baffles. The frusto-conical baffles are disposed with the small end up and, accordingly, have bottom inlets 33 of greater cross-section than top outlets 34. Juxtaposition of the frusto-conical baffle with the hooded baffle of an adjacent stilling chamber forms an intermediate annulus 35 which has a minimum cross-section at a horizontal plane extending from the bottom of hooded baffle 29 or the bottom of the frusto-conical baffle 32 whichever is at the higher elevation. The intermediate annuli formed by these elements generally define a flow path for circulation of slurry oil from top to bottom of the reaactor with back-mixing in the flow as later described. The vertical relationship between the frusto-conical baffle and the hooded baffle of the adjacent stilling chamber is not critical except to the extent that it may affect cross-sectional flow areas later discussed. Preferably, the vertical relationship will provide for the bottom inlet of a frusto-conical baffle to be located below the entry to a stilling chamber in order to reduce turbulence at the entry. The vertical relationship between adjacent frusto-conical baffles is such that top outlet of a baffle is proximate to the bottom inlet of the next higher frusto-conical baffle thus forming inner annulus 36. Preferably, the aforementioned outlet and inlet will be approximately at the same horizontal plane in order to effect a good compromise between desired back-mixing at each contacting stage and minimal turbulence at entry of the stilling chambers. Nesting of a frusto-conical baffle within the next higher baffle will tend to reduce both back-mixing and stilling chamber entry turbulence whereas an increased vertical spacing will have the opposite effect.

Overall relationship of the contacting stages and clear oil outlet means must be guided by the recognition that a relatively high velocity, bottom to top recirculation rate of slurry oil is desired upwardly within and downwardly outside the frusto-conical baffles in the range typically of 0.3 to 2.0 m/sec to promote good suspension of catalyst in the oil. In contrast, relatively low liquid velocity is desired in the stilling chambers in the range typically of 0.0005 to 0.005 m/sec to promote good separation of oil and catalyst by settling. With respect to the latter, the stilling chamber entries will have individual cross-sectional areas between 6 and 60 percent, preferably between 20 and 40 percent of the cross-sectional area of the reactor's cylindrical shell. The cross-sectional areas of the slurry oil upward and downward recirculation flow paths are less critical but should be approximately equal. Typically, the ratio between the cross-sectional area of the intermediate annulus and the cross-sectional area of the bottom inlet of the corresponding frusto-conical baffle will be between 0.5 and 2. It is necessary to ensure that the intermediate annulus formed between the hooded baffle and the frusto-conical baffle is sufficiently large for downward flow of slurry oil and will typically have a minimum cross-section area between 10 and 50 percent of the cross-sectional area of the shell. Taper of the frusto-conical baffles is a compromise among confinement of gas flow within the frusto-conical baffles, desired back-mixing between the contacting stages, and overall limitations of vessel diameter. Preferably, the ratio of inlet cross-sectional area to outlet cross-sectional area of a frusto-conical baffle will be between 1.5 and 3 and the cone angle with respect to the vertical axis will be between 2 and 15 degrees.

In operation of the FIG. 2 hydrotreating reactor, a slurry oil level 37 is maintained above the uppermost clear oil outlet 26 but well below gas outlet 25 by introduction of oil feed and catalyst through oil feed inlet means 27 and steady-state withdrawal of a controlled amount of clear oil from the four clear oil outlets 26, the flow rates from each of the outlets being approximately the same.

Hydrogen is introduced to the reactor through gas inlet means 24 and passes upwardly through the central portion of the reactor at a superficial gas velocity between 0.05 and 1 m/sec. Along with gaseous reaction products, the hydrogen is discharged through gas outlet means 25 for hydrogen recovery and recycle to reactor gas inlet means 24. Upward flow of hydrogen causes liquid pumping in the reactor with an overall central upflow at an average liquid velocity between 0.6 and 2 m/sec and a corresponding downflow through intermediate annuli 35. The overall liquid recirculation weight flow rate is greater than the oil feed rate by a factor between 20 and 200. Despite the overall bottom to top to bottom recirculation path, the inner annuli 36 formed by juxtaposition of the frusto-conical baffles are regions of intermittent, bi-directional flow and turbulent eddy currents caused by central, internal upflow and corresponding external downflow of slurry oil. These conditions develop back-mixing at each contacting stage such that part of the central, upward flow is entrained into the downflow and vice versa. In this manner, effective liquid/gas contacting is significantly improved over that possible in conventional drift-tube, hydrotreating reactors despite single pass flow of hydrogen through the reactor. Further, the combination of multiple contacting stages and multiple clear oil outlets makes high capacity hydrotreating possible in contrast to the limited capacity of single stage reactors.

We claim:

1. A hydrotreating reactor comprising:
   (a) a vertical pressure vessel having a cylindrical shell and top and bottom heads contiguous with the cylindrical shell;
   (b) gas inlet means disposed axially in the vessel proximate the bottom thereof;
   (c) gas outlet means disposed in the vessel proximate the top thereof;
   (d) oil feed inlet means disposed in the vessel;
   (e) a plurality of vertically spaced clear oil outlet means, each of the clear oil outlet means comprising a clear oil outlet disposed in the cylindrical sheel and an annular, internal, hooded baffle having a conical portion contiguous with the cylindrical shell at a point proximately above the clear oil outlet and extending downwardly below the clear oil outlet and away from the cylindrical shell to form an annular stilling chamber with the cylindrical shell, the stilling chamber having an entry with a cross-sectional area between 6 and 60 percent of the cross-sectional area of the cylindrical shell;
   (f) a plurality of vertically spaced contacting stages, each of the contacting stages comprising a frusto-conical baffle disposed axially within the cylindrical shell and spaced adjacently from at least one of the annular, internal, hooded baffles to form an intermediate annulus, the frusto-conical baffle having a bottom inlet and a top outlet, the bottom inlet having a cross-sectional area greater than that of the top outlet and wherein the top outlet of a lower frusto-conical baffle is proximate to the bottom inlet of the next higher frusto-conical baffle and lie approximately on a common horizontal plane to form inner annuli therewith; and (g) slurry oil outlet means disposed in the vessel proximate the bottom thereof and external to a frusto-conical baffle.

2. The reactor of claim 1 wherein the annular, internal, hooded baffle includes a cylindrical skirt parallel to the cylindrical shell of the vessel.

3. The reactor of claim 1 wherein the bottom inlet of the frusto-conical baffle is disposed below the entry of the adjacent stilling chamber and the intermediate annulus has a minimum cross-sectional area between 10 and 50 percent of the cross-sectional area of the shell.

4. The reactor of claim 1 wherein the gas inlet means comprises a plurality of nozzles arranged for discharge of gas toward the bottom inlet of the lowermost contacting stage.

5. The reactor of claim 3 wherein the ratio between the minimum cross-sectional area of the intermediate annulus and the cross-sectional area of the bottom inlet of the frusto-conical baffle is between 0.5 and 2.

6. The reactor of claim 1 having from 2 to 10 contacting stages.

* * * * *